United States Patent
Kashyap et al.

(10) Patent No.: US 8,250,538 B2
(45) Date of Patent: Aug. 21, 2012

(54) OPTIMIZATION OF SYSTEM PERFORMANCE THROUGH SCENARIO EVALUATION

(75) Inventors: Vivek Kashyap, Beaverton, OR (US); Gerrit Huizenga, Portland, OR (US); Russell H. Weight, Hillsboro, OR (US); Badari Pulavarty, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1110 days.

(21) Appl. No.: 12/135,156

(22) Filed: Jun. 7, 2008

(65) Prior Publication Data
US 2009/0307670 A1    Dec. 10, 2009

(51) Int. Cl.
G06F 9/44    (2006.01)
(52) U.S. Cl. ........................................ 717/124
(58) Field of Classification Search .............. 717/135
See application file for complete search history.

(56) References Cited

U.S. PATENT DOCUMENTS

| | | | |
|---|---|---|---|
| 6,205,575 B1 | 3/2001 | Sherman et al. | |
| 6,862,623 B1 | 3/2005 | Odhner et al. | |
| 2003/0093408 A1 | 5/2003 | Brown et al. | |
| 2005/0005012 A1 | 1/2005 | Odhner et al. | |
| 2005/0086242 A1 | 4/2005 | Ngai et al. | |
| 2006/0074970 A1 | 4/2006 | Narayanan et al. | |
| 2006/0161884 A1 | 7/2006 | Lubrecht et al. | |
| 2008/0301691 A1* | 12/2008 | Mamagkakis et al. | 718/104 |
| 2009/0138843 A1* | 5/2009 | Hinton et al. | 717/101 |

* cited by examiner

*Primary Examiner* — Kuen Lu
*Assistant Examiner* — Deric Ortiz
(74) *Attorney, Agent, or Firm* — Walter W. Duft (57) ABSTRACT

A system, method and computer program product for optimizing a software system through scenario evaluation. In accordance with the disclosed technique, a request is received for evaluation of an operational scenario that operates over an environment that is a superset of existing system capabilities encompassing system features or parameters that are not available in the currently running system. A knowledge base is consulted to derive recommendations with respect to operating parameters that may be collected to evaluate the scenario, mechanisms for gathering data relating to the parameters, and data evaluator operations for deriving a data evaluation result based on the data gathering. The knowledge base is further consulted to determine a reconfiguration recommendation based on the result. Scenario evaluation is performed based on simulation of the reconfiguration recommendation using the data evaluation result to determine efficacy of the scenario.

20 Claims, 3 Drawing Sheets

OPTIMIZATION OF SYSTEM PERFORMANCE THROUGH SCENARIO EVALUATION

BACKGROUND OF THE INVENTION

1. Field of the Invention

The present invention relates to automated performance analysis and optimization of software systems. More particularly, the invention is directed to automated tools for evaluating software operation under workload conditions and providing software reconfiguration suggestions.

2. Description of the Prior Art

By way of background, software system performance is dependent on the interaction of the software with available resources, and with resource usage patterns. Software analysis and optimization attempts to improve a software system's resource utilization capabilities. Existing techniques include:

i) Monitoring of software operation and dynamic tuning of known resources;
ii) Collection of system statistics to understand workload/system behavior, followed by expert analysis of the patterns and recommendation of software tuning or reconfiguration (within existing system capabilities) for performance optimization; and
iii) Benchmarking and simulations to determine impacts of software tuning or reconfiguration (within existing system capabilities) on performance.

Such dynamic tuning techniques are time consuming and dependent on knowledgeable individuals (to make recommendations, run benchmarks, tune applications/systems), or require special infrastructure. Moreover, existing dynamic tuning solutions work within the confines of the tunable parameters that are included in the system environment. For example, the solution may tune the CPU or the in-memory footprint allowed for an application, but cannot recommend modifications of the system itself, such as adding or removing hardware or recompiling the application or the underlying operating system.

An automated mechanism that provides recommendations for system optimization in an efficient manner without the aforementioned limitations would be desirable.

SUMMARY OF THE INVENTION

An advance in the art is obtained by a system, method and computer program product for optimizing software system performance through scenario evaluation. In accordance with an example disclosed technique, a request is received for evaluation of an operational scenario that operates over an environment that is a superset of existing system capabilities encompassing features or parameters that are not available in the currently running software system. A knowledge base is consulted to determine (1) recommendations with respect to operating parameters that may be collected to evaluate the scenario, (2) mechanisms for gathering data relating to the parameters, and (3) data evaluator operations for deriving a data evaluation result based on the data gathering. The knowledge base is further consulted to determine a reconfiguration recommendation based on the data evaluation result. Scenario evaluation is performed based on simulation of the reconfiguration recommendation to determine the efficacy of the scenario without having to actually implement the currently unavailable system features or parameters.

According to example disclosed embodiment, the knowledge base may be programmable and may comprise data for plural scenarios representing different operational domains of one or more software systems. The knowledge base may comprise, for each scenario, one or more parameters to be collected, one or more collection mechanisms, one or more data evaluators and expert knowledge pertaining to the scenario. The reconfiguration recommendation may be determined by applying the expert knowledge to data evaluation results generated by the data evaluator(s). The scenario evaluation may also comprise performing actual implementation of a portion of the reconfiguration recommendation that can be implemented using currently available system features. The scenario evaluation may also be performed as necessary on one or more additional reconfiguration recommendations or scenarios to identify an optimum scenario and reconfiguration recommendation.

BRIEF DESCRIPTION OF THE DRAWINGS

The foregoing and other features and advantages of the invention will be apparent from the following more particular description of an example embodiment of the invention, as illustrated in the accompanying Drawings, in which.

DETAILED DESCRIPTION OF EXAMPLE EMBODIMENTS

Figure 1:
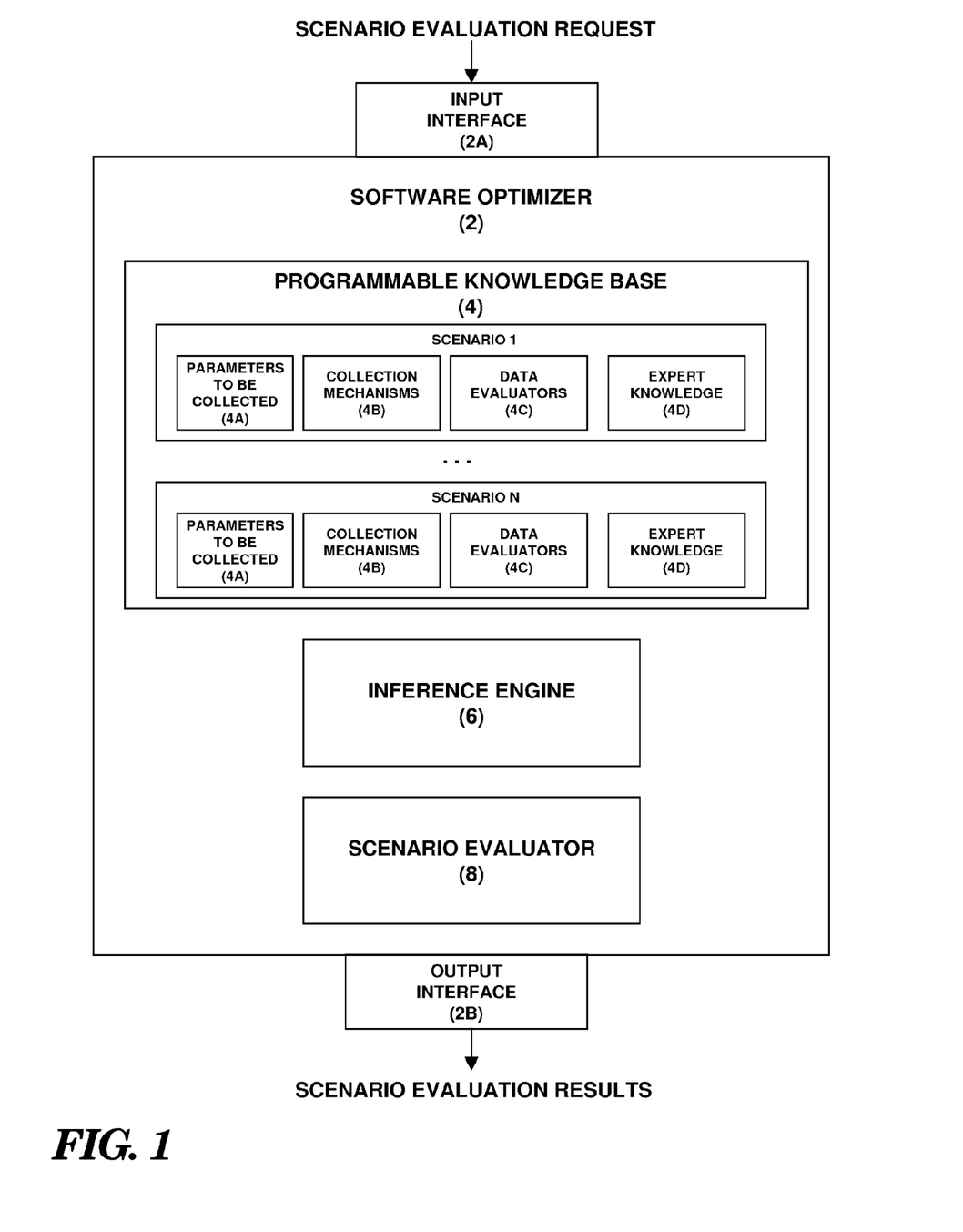
FIG. 1 is a functional block diagram showing a software optimization tool constructed in accordance with the present disclosure.

The invention will now be described by way of example embodiments shown by the drawing figures, in which like reference numerals indicate like elements in all of the several views. Turning to FIG. 1, an example software optimization tool (software optimizer) 2 is shown that may be used to evaluate the performance of a software system (not shown in FIG. 1) and determine whether specific reconfiguration alternatives would be beneficial. Unlike conventional dynamic tuning systems, such reconfiguration alternatives will encompass a superset of existing system capabilities, such as reconfiguration of hardware, software or other system features or parameters that are not available in the currently running software system. The software system could be any software running on a hardware platform, including but not limited to operating systems and subsystems, application programs, etc. The hardware platform on which the software system operates could be any of a variety of devices capable of instruction processing, including programmed general purpose computers, portable devices, network communications equipment, etc.

Based on user input identifying an existing problem, specifying a desired result, or postulating a specific operational scenario regarding some aspect of software system performance, the software optimizer 2 generates one or more proposed recommendations, tests those recommendations through simulation, and provides a final result to the user. As stated, the postulated scenario will operate over an environment that is a superset of existing system capabilities, encompassing features that are not currently available in the running system, but may be evaluated by the software optimizer without having to implement actual hardware, software or other system modifications. Examples include adding or removing hardware, software recompilation, software restarting (e.g., an operating system reboot with modified boot parameters), network changes, etc. Scenarios that do not require system reconfiguration may also be evaluated so that a range of solutions are tested. The scenario evaluation result provided to the user will determine the impact of the proposed scenario on software system performance. The recommendations and evaluations take into account the effect of the proposed changes on existing parameters in order to verify the effect of the changes. A user can therefore evaluate possible system reconfigurations without actually having to undertake possibly time consuming and costly reconfiguration of hardware or application or operating system software.

As described in more detail below, the software optimizer 2 is adapted to perform automated evaluation of various scenarios based on a database of tuning parameters and tools, specific results, and generalized suggestions. To accomplish the foregoing, the software optimizer 2 may utilize a programmable knowledge base (e.g., a database) 4, an inference engine 6 and a scenario analyzer 8. An input interface 2A and an output interface 2B are further provided.

Figure 2:
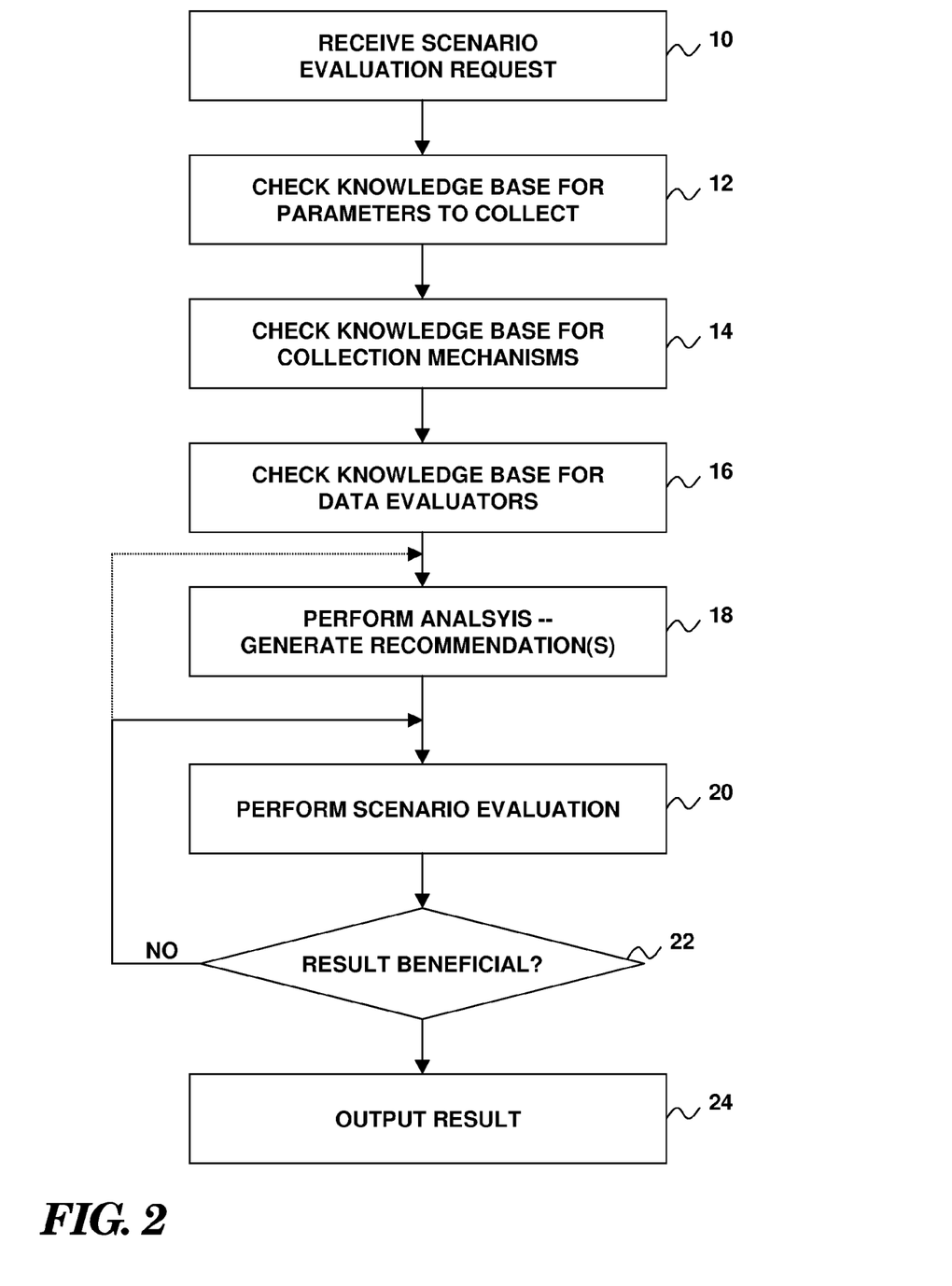
FIG. 2 is a diagram illustrating exemplary operations that may be performed to implement software optimization using the software optimization tool of FIG. 1.

As shown in block 10 of FIG. 2, the software optimizer 2 is adapted to receive user input via the input interface 2A, which, in one embodiment, could be implemented as a command-line, text-based or other type of user interface that can be used to run an application or set of applications (workload). Depending on the analysis capabilities built into the software optimizer 2, the input interface 2A may be very flexible as to the type of input that can be provided. By way of example only, the user input might indicate that a particular software application is experiencing memory allocation delays. Based on this input, and perhaps prompted by further questioning of the user, the software optimizer 2 may determine in block 10 that a useful scenario to evaluate is whether the memory allocation problem would be helped by using large memory pages. In such a case, the software optimizer 2 would perform pre-processing of the user input in order to determine that a large page scenario should be evaluated. One way that this could be done is by maintaining a list of operational problems or symptoms in association with the scenarios (see below) stored in the knowledge base 4. The user, in one embodiment, may also directly request the software optimizer 2 to evaluate a large page scenario, particularly if the user is knowledgeable in the area of virtual memory systems. In that case, the software optimizer 2 does not need to pre-process the user input in order to make a scenario recommendation. The scenario would already be specified by the user. Regardless of how block 10 is implemented, the end result of its processing will include an identification of one or more scenarios to be evaluated, and possibly information about the workload of the software system to be optimized.

As shown in blocks 12, 14 and 16 of FIG. 2, the scenario identified in block 10 is processed using the knowledge base 4 of FIG. 1. The knowledge base 4 may be programmed with expert information that is used derive recommendations with respect to four areas of knowledge for any given scenario. These knowledge areas include parameters 4A that are to be collected for a given type of workload, collection mechanisms 4B that are available to collect the parameter data, data evaluator(s) 4C that may be used to evaluate the collected data and provide data evaluation results, and expert/domain knowledge 4D that is used to process the evaluation results provided by the data evaluators into reconfiguration recommendations. As shown in FIG. 1, the number of different scenarios that may be represented in the knowledge base 4 is not restricted and is completely customizable. Each scenario represents part of a framework that may added to the knowledge base 4 as a software module (or set of modules) created by individuals having expert domain knowledge. Example frameworks could be based on operating system-level domains such as virtual memory systems, scheduling systems, etc., application-level domains such as database systems, or network domains such as switch/router systems, to name but a few. The specific content of such frameworks will depend on the environment in which the software system 2 will be used. It is expected that each enterprise will develop or otherwise acquire its own expert knowledge according to specific needs. Two specific examples of the kind of expert knowledge that may be stored in the knowledge based 4 are described below. One example is the large page scenario introduced above. The other example is a power management scenario that seeks to determine an optimal system configuration for minimizing power consumption. Based on these examples, persons skilled in the art following the guidance of the present disclosure will find it relatively easy to populate the knowledge base 4 with additional scenarios, including, but not limited to:

1) scenarios relating to the optimization of hardware resources (e.g., CPU, I/O, network traffic, etc.);
2) scenarios relating to application-level performance, such as database operation;
3) scenarios relating to operating system-level performance, such as virtualization and server consolidation scenarios.

The parameters 4A pertain to operational characteristics that are pertinent to particular scenarios. These may include resource usage parameters, tuning parameters, parameter value ranges of interest and other operational data that are relevant to an existing workload or system configuration of the software system under test. By way of example, for a large memory page scenario, the parameters of interest could include the rate of page faults and locality data representing the memory layout of an application. This information can be used to determine which section of memory is being accessed by the application workload, and the rate and locality of the accesses. For a power management scenario, the parameters of interest could include CPU utilization statistics, I/O utilization statistics, memory utilization statistics, CPU layout information, memory layout information, CPU capabilities, and CPU power state statistics. Block 12 of FIG. 2 represents a check of the knowledge base 4 to identify the parameters 4A that should be collected for a particular scenario.

The collection mechanisms 4B represent tools and techniques that may be used to gather operational data for the parameters 4A. Such mechanisms could be automated tools or they could be manual instructions that need to be implemented by a user. The collection mechanisms 4B will often depend on the hardware and operating system of the system under test, as well as the availability of other mechanisms and toolkits. Examples include the OProfile system profiler and the System Tap instrumentation system for Linux® environments, operating system-based statistics providers, etc. Other examples include database monitoring tools, network switch connection statistics providers, SAN storage network statistics providers, etc. The system under test may be instrumented with whatever tools are required to handle the parameters that need to be collected. The data might be collected over time, as a single snapshot or when certain events occur that are relevant to the resource(s) being monitored. For a large page scenario, there are conventional tools available to monitor page faults and memory locality characteristics for different hardware/operating system combinations. For a power management scenario, operating systems typically provide different sets of tools and methods to collect information relating to power management scenarios of interest. Block 14 of FIG. 2 represents a check of the knowledge base 4 to identify the collection mechanisms 4B that should be used to collect the parameters 4A for a particular scenario.

Once the parameter data is collected by one or more collection mechanisms 4B, one or more data evaluators 4C are selected for evaluating the data. Again, the choice of data evaluators 4C will often depend on the hardware and operating system of the system under test, as well as the parameters 4A being tested. Examples include evaluators that apply formulas or perform operations (e.g., plot a graph, determine a range, etc.) that derive a data evaluation result. Example data evaluators 4C would include evaluators that calculate page fault results, memory utilization results, power utilization results, etc., based on the collected parameter data. Block 16 of FIG. 2 represents a check of the knowledge base 4 to identify the data evaluators 4C that should be used to evaluate the data collected by the collection mechanisms 4B for a particular scenario.

The inference engine 6 of FIG. 1 is used to generate reconfiguration recommendations based on a given scenario. This is shown by block 18 of FIG. 2. The inference engine 6 invokes the collection mechanisms 4B to collect the parameters 4A, and invokes the data evaluators 4C to evaluate the collected data and generate evaluation results. The inference engine 6 may then perform its recommendation analysis by comparing the output generated by one or more of the data evaluators 4C with specific expert/domain knowledge 4D that is stored in the knowledge base 4 in connection with the scenario being evaluated. For example, in the case of a large page scenario, the data evaluator(s) 4C, in one embodiment, could generate a report on what was found relative to page faults and application memory usage (e.g., the rate and locality of accesses). The inference engine 6 could then use the report data to work through the knowledge base entries representing the expert/domain knowledge 4D, and generate a set of one or more recommendations. For the large page example, a recommendation could be that some specified portion of an application's data should be placed under large pages. The recommendation could further specify the size of the large pages and the expected performance gains that would be achieved if the recommendations are followed. A set of recommendations could include a series of different page sizes within a specified page size range. Instructions could also be provided to advise the user how to configure large pages or configure them for use by a particular application.

In most systems, the recommendation(s) for the large page scenario will require a larger set of resources than are available in the current environment of the system under test, thus requiring system modification. Specifically, the underlying operating system may need to be recompiled for large page support. Alternatively, large page support may be compiled into the operating system but will not be activated unless the operating system is booted with large page support being specified as a boot parameter. Even if the operating system already supports large pages, the application software may not, thus requiring reconfiguration at the application level. In other cases, the required large page support may be within current system capabilities, requiring only a system call or a command to change the page size. In such systems, the recommendation will include a currently available feature. This illustrates that although the scenario evaluation can be performed over a superset of system capabilities, the actual recommendation may or may not include a currently unavailable feature.

For a power management scenario, the data evaluator(s) 4C, in one embodiment, could generate a report on what was found relative to CPU, I/O and memory utilization, as well as CPU capabilities, I/O capabilities and memory layout information. The inference engine 6 could then use the report data to work through the knowledge base entries representing the expert/domain knowledge 4D, and gather a set of one or more recommendations. For the power management example, a recommendation could be to place one or more CPUs in a low power state due to those CPUs being underutilized. The recommendation could further specify the depth of the low power state relative to each CPU, the conditions under which the low power states might be adjusted or terminated altogether, and the expected power savings that would be achieved if the recommendations are followed. Again, such recommendations are completely customizable according to the expert knowledge stored in the knowledge base 4. A set of recommendations could include a series of different CPU power state configurations. Instructions could also be provided to advise the user how to implement these power states.

In many cases, the recommendation(s) for the power management scenario will require a larger set of resources than are available in the current environment of the system under test, thus requiring system modification. For example, the power management recommendation(s) might include turning off one or more memory banks. The underlying operating system may need to be recompiled to reconfigure the memory bank and zone definitions. Alternatively, such memory configuration features may be compiled into the operating system but will not be activated unless the operating system is booted with the required support being specified as a boot parameter. In other cases, the required power configuration support may be within current system capabilities, requiring only a system call or a command to implement the change. In such systems, the recommendation will include a currently available feature. This again illustrates that although the scenario evaluation can be performed over a superset of system capabilities, the actual recommendation may or may not include a currently unavailable feature.

The scenario evaluator 8 of FIG. 1 is used to collect the one or more recommendations generated by the inference engine 6, apply the recommendation(s), and run it/them through a scenario analysis to test the efficacy of the recommended change(s). As previously stated, the recommendation(s) may or may not be within current system capabilities. Alternatively, one recommendation may relate to a currently available feature while another relates to a currently unavailable feature. Thus, applying the recommendation(s) might in some cases involve user input to make certain tuning changes to the system under test that are within the current capabilities of the system under test (e.g., to configure an application to run a certain way). The recommendation(s) may or may not additionally include features that are not currently available. If a recommended feature is not available, it will need to be implemented by creating an empirical model of the system that assumes the recommended system change(s) (hardware or software) has/have been made. Based on the assumed system reconfiguration, a run of the system can be simulated using the historical parameter data collected pursuant to blocks 12-16 of FIG. 2. This is described in more detail below.

Block 20 of FIG. 2 represents scenario evaluation processing performed by the scenario evaluator 8 according to the recommendation(s) provided by the inference engine 6. Taking the large page example, given the locality and page fault data that was collected by the data evaluator(s) 4C, a recommendation by the inference engine 6 might be to utilize large pages within a specified size range. During scenario evaluation, the previously-collected memory access pattern information for the running application can be utilized to empirically determine if a run with large pages of a given size will indeed benefit the application. For example, the scenario evaluator 8 can determine the number of page faults that will occur if the scenario is implemented, and whether or not there will be a memory utilization penalty due to over-allocation of memory pages that are not fully utilized.

For the power management example, a recommendation by the inference engine 6 might be to place one or more CPUs in a low power state. During scenario evaluation, the previously-collected CPU utilization data, together with CPU power statistics, could be applied to determine the total power savings that would result if the workload is assumed by the remaining CPUs (thereby increasing their individual power requirements). Another power management recommendation might be to turn off sections of memory to save power. During scenario evaluation, the previously collected memory utilization parameters could be used to determine the total power savings that would result from limiting memory accesses to the remaining memory sections.

Any suitable technique may be used to perform the simulation analysis, and can be programmed as part of the expert knowledge 4D in the knowledge base 4. Thus, most, if not all, recommendations can be tested and quantified without actually executing them. As indicated above, this is mainly due to the previous evaluation and data sampling of the running/live system under test. For example, the simulation can be performed by having the inference engine 6 rerun the data evaluators 4C based on the historical parameter data previously collected by the collection mechanisms 4B, but assuming a modified system that has been reconfigured according to one (or more) of the reconfiguration recommendations (which can be fed back to the data evaluators). In other words, the inference engine 6 can feed back the simulated system information to the data evaluators 4C, and have them perform a second round (iteration) of data evaluation.

In the case of large pages, once the rate of page faults and the memory access pattern are known, the benefits of using large pages can be quantified without actually using them. For example, if the data shows a high rate of page faults when an application's memory access pattern is to utilize 8-16 KB areas of memory, it may be readily verified by a data evaluator 4C that a large page size of 16 KB will be beneficial. A new page fault rate can be calculated and verified to be lower than the original page fault rate associated with the smaller pages. Importantly, the user is saved the expense of rebuilding or restarting the software system to test out the new feature.

Similarly, in the case of power management, if four CPUs are being underutilized due to having a 60% utilization rate, it may be readily verified that one CPU could be powered down and its workload divided among the remaining three CPUs, each of which would the operate at 80% utilization. Again, the user is saved the expense of rebuilding or restarting the software system to test out the new feature.

Block 22 of FIG. 2 seeks to determine from the scenario evaluation if implementing the scenario will be beneficial. This processing may calculate the efficiency of each scenario recommendation (if there are more than one), along with the feasibility and practicality of implementing the recommendation. The inference engine 6 can be used to implement block 22 by generating a new recommendation based on the simulated system reconfiguration. Specifically, the inference engine 6 can invoke the expert knowledge 4D to apply it against the new round of data evaluation results generated by rerunning the data evaluators 4C using a system reconfiguration recommendation made by the inference engine 6. The resulting second round (iteration) recommendation may or may not indicate that further reconfiguration is warranted. Thus, for the large page example involving 8 KB versus 16 KB pages, the use of 16 KB pages may well reduce page faults, but such a large page size may result in inefficient memory utilization, which could be disadvantageous for systems with limited memory resources. For example, an additional consideration might be that only one particular application thread running 50% of the time requires the large pages. The remaining application threads might all be short-lived threads that would suffer a performance penalty from having to allocate large pages. Thus, an additional calculation may be performed is to calculate the cost associated with using the 16 KB large pages in comparison to the benefit thereof. This may result in a modified recommendation to use a large page size that is less than 16 KB, or alternatively, to reduce the number of 16 KB pages. For the power management example involving four CPUs, the total power required by three processors operating at 80% utilization may be not be much less than the total power required by four processors operating at 60% utilization, and it may be further determined that a performance hit would result due to periodic spikes in workload that require waking the sleeping CPU.

Based on the processing of block 22 of FIG. 2, scenario evaluation can be iteratively performed by the scenario evaluator 8 to optimize on a single initial recommendation (as indicated by the arrow from block 22 to block 20), possibly testing multiple rounds of derivative recommendations, until an appropriate final recommendation is made to the user via the output interface 2B (e.g., reconfigure the system under test to use large pages of size "x," power down "y" CPUs, disable memory bank "z," etc.). This is shown by block 24 of FIG. 2.

If there were several initial reconfiguration recommendations, block 22 of FIG. 2 can also be implemented to invoke the scenario evaluator 8 in block 20 to analyze the next initial recommendation made by the inference engine 6, and repeat blocks 20 and 22 for each initial recommendation. For a large page example, the scenario evaluator 8 could test a next recommended large page size to determine if it would be more appropriate than a first recommended size. For a power management scenario, the scenario evaluator 8 could test a next power management recommendation, etc. This iteration may continue until all of the initial recommendations (if there are more than one) from the inference engine 6 have been tested for a given scenario. If none of the initial recommendations is deemed to be beneficial, the inference engine 6 could be re-invoked in block 18 of FIG. 2 to analyze another scenario that is germane to the problem at hand. This alternative processing pathway is shown by the dashed line in FIG. 2. Based one the results of one or more simulated scenario evaluations, the user can evaluate one or more proposed reconfigurations, and their impact (positive or negative) on the software system. Advantageously, this can be done without actually implementing any reconfiguration recommendation, thereby allowing the scenarios to operate over a superset environment that goes beyond the present capabilities of the system under test.

The foregoing software optimization technique could be used by software vendors and users to tune their software systems and applications. The knowledge base 4 is fully configurable so that software vendors can incorporate expert knowledge within their own sphere of expertise, thereby allowing their customers to use the software optimizer 2 to solve application-specific problems. As stated, the technique does not require actual implementation of each recommendation, and instead allows even a non-expert lay user to speedily fine-tune a system or application based on predictive scenario evaluation. This allows the software optimizer 2 to go beyond generic expert systems into the realm of scenarios that require recompilation or other substantial reconfiguration due to the scenarios encompassing operational modes that are not presently available in the existing system. The software optimizer 2 allows such reconfigurations to be simulated in advance, thereby quickly enabling a user to verify whether an actual system reconfiguration effort is warranted.

Figure 3:
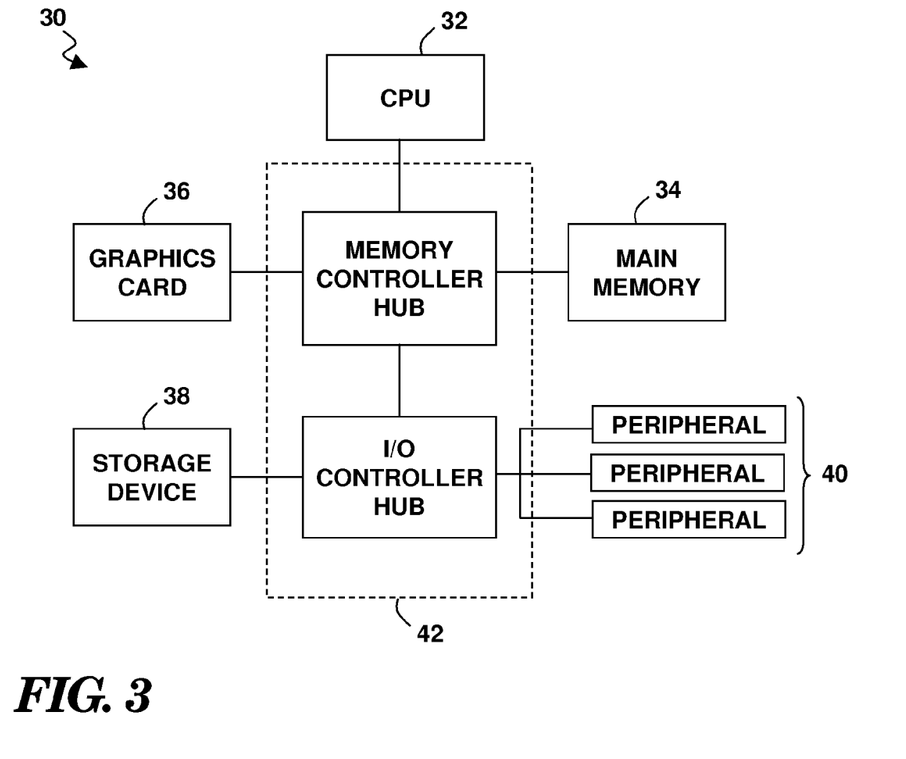
FIG. 3 is a block diagram illustrating an exemplary hardware environment in which the software optimization tool of FIG. 1 may be implemented.

Accordingly, a software system optimization tool has been disclosed. It will be appreciated that the foregoing concepts may be variously embodied in any of a data processing system, a machine implemented method, and a computer program product in which programming logic is provided by one or more machine-readable media for use in controlling a data processing system to perform the required functions. Relative to a data processing system and machine implemented method, FIG. 3 illustrates an example hardware environment 30 in which the software optimizer 2 may be implemented. The system under test may also run on the hardware environment 30. Alternatively, the system under test may run on a different hardware environment. The hardware environment 30 includes one or more of a CPU or other data processing resource 32, a physical memory 34, an optional graphics card 36 for generating visual output to an optional monitor (not shown), a peripheral storage device 38, other peripheral devices 40, and a bus infrastructure 42 interconnecting the foregoing elements. The software optimizer 2 may be implemented as software loaded in the memory 34 for execution on the data processing resource 32. If a user interface is provided, it may be accessed through user interaction with the peripheral devices 40 (e.g., keyboard, mouse, etc.).

Figure 4:
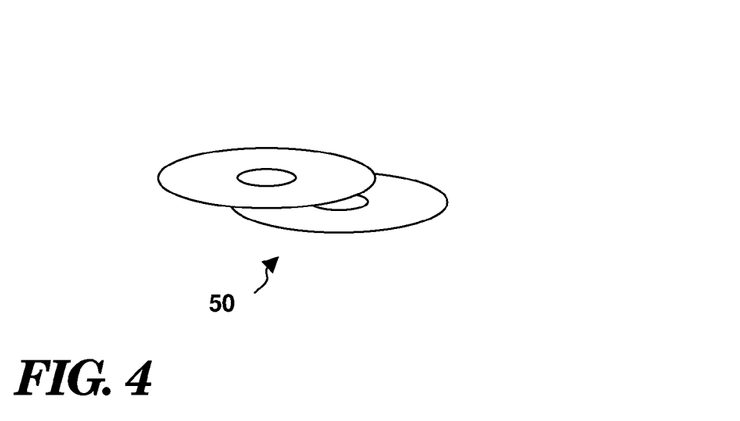
FIG. 4 is a diagrammatic illustration showing physical media that may be used to provide a computer program product for implementing the software optimization tool of FIG. 1.

Relative to a computer program product having a machine-readable media and programming logic for controlling a data processing system, example machine-readable media for providing such programming logic are shown by reference numeral 50 in FIG. 4. The media 50 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality (such as a software application with support for self-optimization). Moreover, the network connection failover functionality described herein could be distributed across several media 50, each of which is intended to be used by a different data processing system. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or signal-carrying medium (such as a network), or other entity that can contain, store, communicate, propagate or transport the programming logic for use by or in connection with a data processing system, computer or other instruction execution system, apparatus or device.

Although an embodiment of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a hardware environment having a data processing resource, a physical memory, a peripheral storage device and one or more peripheral user interface devices, a machine-implemented method for optimizing a software system running in said hardware environment (or in a different hardware environment) through scenario evaluation, comprising:

receiving at an input interface provided by said one or more user interface devices a request for evaluation of an operational scenario of said software system that operates over an environment that is a superset of existing system capabilities encompassing system features or parameters that are not available in a currently running instance of said software system;

consulting a knowledge base implemented by said hardware environment to determine (1) recommendations with respect to operating parameters of said software system that may be collected to evaluate said scenario, (2) mechanisms for gathering data from said software system relating to said parameters, and (3) data evaluator operations for deriving a data evaluation result based on said data gathering;

initiating said data gathering mechanisms and data evaluator operations to gather data from said software system relating to said operating parameters and to evaluate said data to generate said data evaluation result consulting said knowledge base to determine a reconfiguration recommendation based on said data evaluation result; and performing scenario evaluation based on simulation of said reconfiguration recommendation to determine efficacy of said scenario without having to actually implement said currently unavailable system features or parameters.

2. A method in accordance with claim 1 wherein said knowledge base is programmable and comprises data for plural scenarios representing different operational domains of one or more software systems.

3. A method in accordance with claim 2 wherein said knowledge base comprises, for each scenario, one or more parameters to be collected, one or more data gathering collection mechanisms, one or more data evaluators and expert knowledge pertaining to said scenario.

4. A method in accordance with claim 3 wherein said reconfiguration recommendation is determined by applying said expert knowledge to data evaluation results generated by said data evaluator(s).

5. A method in accordance with claim 4 wherein scenario evaluation further comprises performing actual implementation of a portion of said reconfiguration recommendation.

6. A method in accordance with claim 1 further including performing scenario evaluation on one or more additional reconfiguration recommendations or scenarios to identify an optimum scenario and reconfiguration recommendation.

7. A system for optimizing a software system using scenario evaluation, comprising:

a hardware environment having a data processing resource, a physical memory, a peripheral storage device and one or more peripheral user interface devices;

an input interface provided by said one or more peripheral user interface devices, said input interface being adapted to receive a request for evaluation of an operational scenario that operates over an environment that is a superset of existing system capabilities encompassing system features or parameters that are not available in the currently running system;

a knowledge base implemented by said hardware environment, said knowledge base comprising knowledge with respect to operating parameters of said software system that may be collected to evaluate said scenario, mechanisms for gathering data from said software system relating to said parameters, and data evaluator operations for deriving a data evaluation result based on said data gathering;

an inference engine implemented by said hardware environment, said inference engine being adapted to initiate said data gathering mechanisms and data evaluator operations to gather data from said software system relating to said operating parameters and to generate said evaluation result, and to consult said knowledge base to determine a reconfiguration recommendation based on said data evaluation result; and a scenario evaluator implemented by said hardware environment, said scenario evaluator being adapted to perform scenario evaluation based on simulation of said reconfiguration recommendation to determine efficacy of said scenario without having to actually implement said currently unavailable system features or parameters.

8. A system in accordance with claim 7 wherein said knowledge base is programmable and comprises data for plural scenarios representing different operational domains of one or more software systems.

9. A system in accordance with claim 8 wherein said knowledge base comprises, for each scenario, one or more parameters to be collected, one or more data gathering collection mechanisms, one or more data evaluators and expert knowledge pertaining to said scenario.

10. A system in accordance with claim 9 wherein said inference engine is adapted to determine said reconfiguration recommendation by applying said expert knowledge to data evaluation results generated by said data evaluator(s).

11. A system in accordance with claim 10 wherein scenario evaluator is further adapted to perform actual implementation of a portion of said reconfiguration recommendation.

12. A system in accordance with claim 7 wherein said scenario evaluator is adapted to perform scenario evaluation on one or more additional reconfiguration recommendations or scenarios to identify an optimum scenario and reconfiguration recommendation.

13. A computer program product, comprising:
one or more data storage media;
programming means recorded on said data storage media for programming a hardware platform to optimize a software system through scenario evaluation, as by:
receiving a request for evaluation of an operational scenario that operates over an environment that is a superset of existing system capabilities encompassing system features or parameters that are not available in the currently running system;
consulting a knowledge base to determine (1) recommendations with respect to operating parameters of said software system that may be collected to evaluate said scenario, (2) mechanisms for gathering data from said software system relating to said parameters, and (3) data evaluator operations for deriving a data evaluation result based on said data gathering;
initiating said data gathering mechanisms and data evaluator operations to gather data from said software system relating to said operating parameters and to evaluate said data to generate said data evaluation result;
consulting said knowledge base to determine a reconfiguration recommendation based on said data evaluation result; and
performing scenario evaluation based on simulation of said reconfiguration recommendation to determine efficacy of said scenario without having to actually implement said currently unavailable system features or parameters.

14. A computer program product in accordance with claim 13 wherein said knowledge base is programmable and comprises data for plural scenarios representing different operational domains of one or more software systems.

15. A computer program product in accordance with claim 14 wherein said knowledge base comprises, for each scenario, one or more parameters to be collected, one or more data gathering collection mechanisms, one or more data evaluators and expert knowledge pertaining to said scenario.

16. A computer program product in accordance with claim 15 wherein said reconfiguration recommendation is determined by applying said expert knowledge to data evaluation results generated by said data evaluator(s).

17. A computer program product in accordance with claim 16 wherein scenario evaluation further comprises performing actual implementation of a portion of said reconfiguration recommendation.

18. A computer program product in accordance with claim 13 further including performing scenario evaluation on one or more additional reconfiguration recommendations or scenarios to identify an optimum scenario and reconfiguration recommendation.

19. In a hardware environment having a data processing resource, a physical memory, a peripheral storage device and one or more peripheral user interface devices, a method for optimizing a software system running in said hardware environment (or in a different hardware environment) through scenario evaluation, said method comprising:
receiving at an input interface provided by said one or more user interface devices a request for evaluation of an operational scenario of said software system that operates over an environment that is a superset of existing system capabilities encompassing system features or parameters that are not available in a currently running instance of said software system;
consulting a knowledge base implemented by said hardware environment to determine (1) recommendations with respect to operating parameters of said software system that may be collected to evaluate said scenario, (2) mechanisms for gathering data from said software system relating to said parameters, and (3) data evaluator operations for deriving a data evaluation result based on said data gathering;
said knowledge base being programmable and comprising data for plural scenarios representing different operational domains of one or more software systems;
said knowledge base comprising, for each scenario, one or more parameters to be collected, one or more data gathering collection mechanisms, one or more data evaluators and expert knowledge pertaining to said scenario;
initiating said one or more data gathering collection mechanisms and said one or more data evaluators to gather data from said software system relating to said one or more operating parameters and to evaluate said data to generate one or more data evaluation results;

consulting said knowledge base to determine a reconfiguration recommendation based on said data evaluation result(s);

said reconfiguration recommendation being determined by applying said expert knowledge to said data evaluation result(s) generated by said data evaluator(s);

performing scenario evaluation based on simulation of said reconfiguration recommendation to determine efficacy of said scenario without having to actually implement said currently unavailable system features or parameters; and performing further scenario evaluation as necessary on one or more additional reconfiguration recommendations or scenarios to identify an optimum scenario and reconfiguration recommendation.

20. A method in accordance with claim 19 wherein said scenario evaluation is performed by rerunning said data evaluator(s) based on said data gathering and an assumed system reconfiguration based on said reconfiguration recommendation.

* * * * *